US011236200B2

(12) United States Patent
Arkles et al.

(10) Patent No.: US 11,236,200 B2
(45) Date of Patent: Feb. 1, 2022

(54) BIFUNCTIONAL POLY(ALKYLENEOXIDES) WITH AMINOALKYL AND UNSATURATED TERMINI AND DERIVATIVES THEREOF

(71) Applicant: Gelest, Inc., Morrisville, PA (US)

(72) Inventors: Barry C. Arkles, Pipersville, PA (US); Jonathan D. Goff, Philadelphia, PA (US); Ferdinand Gonzaga, Philadelphia, PA (US)

(73) Assignee: GELEST, INC., Morrisville, PA (US)

( * ) Notice: Subject to any disclaimer, the term of this patent is extended or adjusted under 35 U.S.C. 154(b) by 0 days.

(21) Appl. No.: 16/711,748

(22) Filed: Dec. 12, 2019

(65) Prior Publication Data

US 2020/0115498 A1    Apr. 16, 2020

Related U.S. Application Data

(62) Division of application No. 15/217,398, filed on Jul. 22, 2016, now abandoned.

(60) Provisional application No. 62/203,091, filed on Aug. 10, 2015.

(51) Int. Cl.
*C08G 65/337* (2006.01)
*C08G 65/329* (2006.01)
*C08G 65/336* (2006.01)
*C08G 65/26* (2006.01)
*C08G 77/46* (2006.01)
*C08G 77/14* (2006.01)
*C08F 212/08* (2006.01)

(52) U.S. Cl.
CPC .......... *C08G 65/337* (2013.01); *C08F 212/08* (2013.01); *C08G 65/2621* (2013.01); *C08G 65/2624* (2013.01); *C08G 65/2639* (2013.01); *C08G 65/329* (2013.01); *C08G 65/336* (2013.01); *C08G 77/14* (2013.01); *C08G 77/46* (2013.01)

(58) Field of Classification Search
None
See application file for complete search history.

(56) References Cited

U.S. PATENT DOCUMENTS

| 4,996,277 | A | * | 2/1991 | Bradshaw | ............ | G01N 30/482 |
| | | | | | | 528/15 |
| 5,929,177 | A | | 7/1999 | Kataoka et al. | | |
| 6,388,041 | B1 | * | 5/2002 | Kataoka | ............ | C08G 63/6852 |
| | | | | | | 528/14 |

| 6,812,295 | B2 | 11/2004 | Schwindeman et al. |
| 7,888,536 | B2 | 2/2011 | Davis et al. |
| 2016/0032047 | A1 | 2/2016 | Murphy et al. |

FOREIGN PATENT DOCUMENTS

| CN | 101555316 A | 10/2009 |
| EP | 0555101 A2 | 8/1993 |
| EP | 1167418 A1 | 1/2002 |
| EP | 1219661 A1 | 7/2002 |
| JP | H11124791 A | 5/1999 |
| JP | 2011197196 A | 10/2011 |
| JP | 2015516998 A | 6/2015 |
| WO | 9957174 A1 | 11/1999 |
| WO | 2007127440 A2 | 11/2007 |
| WO | 2013142060 A1 | 9/2013 |
| WO | 2014157271 A1 | 10/2014 |

OTHER PUBLICATIONS

Int'l Search Report and Written Opinion dated Oct. 7, 2016 in Int'l Application No. PCT/US2016/044408.
International Preliminary Report on Patentability dated Feb. 22, 2018 in International Application No. PCT/US2016/044408.
Office Action dated Apr. 27, 2018 in U.S. Appl. No. 15/217,398, by Arkles.
Office Action dated Jul. 13, 2017 in U.S. Appl. No. 15/217,398, by Arkles.
Office Action dated Jul. 30, 2019 in JP Application No. P2018-505694.
Office Action dated Sep. 18, 2019 in U.S. Appl. No. 15/217,398, by Arkles.
Office Action dated Dec. 4, 2018 in JP Application No. P2018-505694.
Office Action dated Dec. 28, 2018 in U.S. Appl. No. 15/217,398, by Arkles.
Ueda et al., "Synthesis of Polymers with Amino End Groups. 3. Reactions of Anionic Living Polymes with a-Halo-w-aminoalkanes with a Protected Amino Funtionality", vol. 23, No. 4, pp. 939-945 (1990).
Yokoyama et al, "Synthesys of Poly(ethylene oxide) with Heterobifunctional Reactive Groups at its Terminals by an Anionic Initiator," Bioconjugate Chem., vol. 3, pp. 275-276 (1992).
Intention to Grant dated Nov. 12, 2020 in EP Application No. 16748242.1.
Office Action dated Jul. 23, 2020 in EP Application No. 16748242.1.
Office Action dated Mar. 10, 2020 in JP Application No. 2018505694.

* cited by examiner

*Primary Examiner* — Christopher M Rodd
(74) *Attorney, Agent, or Firm* — Panitch Schwarze Belisario & Nadel LLP

(57) ABSTRACT

A heterofunctional poly(alkyleneoxide) according to the invention contains a first polymer terminus containing a protected, unprotected, or derivatized amine or aminoalkyl functionality and a second polymer terminus containing an unsaturated functionality. Reaction products, derivatives, and methods of making these materials are also described.

12 Claims, No Drawings

BIFUNCTIONAL POLY(ALKYLENEOXIDES) WITH AMINOALKYL AND UNSATURATED TERMINI AND DERIVATIVES THEREOF

CROSS-REFERENCE TO RELATED APPLICATION

This application is a divisional of co-pending U.S. patent application Ser. No. 15/217,398, filed Jul. 22, 2016, which claims priority to U.S. Provisional Application No. 62/203,091, filed Aug. 10, 2015, the disclosures of which are herein incorporated by reference in their entirety.

BACKGROUND OF THE INVENTION

Polymers of alkylene oxides, also known as poly(oxyalkylenes), are a broad class of materials which have utility due to their intrinsic properties as polymers which can behave as surfactants and emulsifiers. Further, these materials are components in higher order molecular structures, ranging from urethane block polymers to biologically active structures in which poly(oxyethylene) derivatization, sometimes referred to as "PEGylation," of proteins, enzymes and alkaloids enhances water-solubility or hydrophilicity compared to the parent biomolecule. An example of the latter is the use of PEGylated interferon as a drug. Formation of higher order structures is dependent on having appropriate reactivity. The preponderant functional poly(oxyethylenes) are telechelic (both termini are the same), and are sometimes referred to as homofunctional PEGs. The most common homofunctional PEGs have hydroxyl groups at the polymer termini. Conversion of the hydroxyl groups to other reactive groups, including allyl, amino, bromo, carboxy, formyl, maleimido and mercapto, is less important commercially, but has demonstrated utility. An overview of this technology is provided in U.S. Pat. No. 7,888,536 of Davis.

Significantly less common are bifunctional poly(oxyethylenes) in which each polymeric molecule has a discretely different functional group at the opposing ends, which is distinct from a random mixture of polymeric molecules which may have an average of two different groups but are in fact distributions. These bifunctional polymers are sometimes referred to as heterofunctional PEGs. Amino-functional poly(oxyethylenes) are of particular interest due to the ability of the amino group to react directly or in combination with a second component, such as glutaraldehyde, with proteins and other biomolecules. To this end, a number of heterofunctional poly(oxyethylenes) having both amino and hydroxyl (carbinol) functionality are known. It is of great interest to generate higher order structures having an end group that can be used for specific PEGylation reactions in which there is a requirement for terminal unsaturated functionality, or to undergo both radical induced polymerization or hydrosilylation reactions as a step in assembling higher order structures. For the formation of modified siloxanes, heterofunctional poly(oxyethylenes) with aminoalkyl and unsaturated functionalities are desirable, especially those not associated with an ester (such as a methacrylate) or an acetal (such as a vinyl ether), since these specific functionalities can interfere with hydrosilylation chemistry. It is also advantageous for hydrosilylation chemistry that the amine group be "blocked" or "protected" by replacement of one or more of the amine hydrogens with a silyl group. U.S. Pat. No. 6,812,295 of Schwindeman suggests a general method for preparing heterobifunctional olefin derived polymers utilizing a "blocked" aminoalkyllithium, but this necessarily introduces an alkyl spacer group. Accordingly, a less restrictive method would be desirable.

BRIEF SUMMARY OF THE INVENTION

A heterofunctional poly(alkyleneoxide) having first and second polymer termini is provided, wherein the first polymer terminus comprises a protected, unprotected, or derivatized aminoalkyl functionality and the second polymer terminus comprises an unsaturated functionality.

DETAILED DESCRIPTION OF THE INVENTION

The invention is directed to a new class of materials which may be described as linear heterofunctional poly(alkyleneoxides) which contain an unprotected, protected or derivatized aminoalkyl functionality at one polymer terminus and an unsaturated functionality at the other polymer terminus. Methods for the preparation of these compounds and examples of their reaction products are also encompassed by the invention. In a protected amine, one or more of the hydrogen atoms has been replaced by a substituent which may be employed after a reaction in which, without protection, the amine proton would interfere. In the presently claimed compounds, the protecting group is most often trimethylsilyl.

Exemplary aminoalkyl termini include unprotected groups such as amine ($NH_2$) and protected amine groups such as silylated amine functional groups including N,N-bis(trimethylsilyl)amine groups, N,N-bis(ethyldimethylsilyl)amine groups, and 2,2,5,5-tetramethyl-2,5-disila-1-azacyclopentanes. Derivatized aminoalkyl termini include amide termini such as acrylamide, methacrylamide or alkylamide or N-substituted ureas. Exemplary unsaturated (or olefinic) termini include allyl, methallyl, and vinylbenzyl. In the polymers according to the invention, n is preferably from 2 to 100. A variety of different alkylene oxides are within the scope of the invention, including ethylene oxides, propylene oxides, butylene oxides, hexafluorinated analogs thereof such as hexafluoropropylene oxides, and glycidyl ethers of silicones.

Exemplary materials according to the invention thus include α-amine (α-aminoalkyl), ω-allyl terminated poly(ethyleneoxides) and α-amine (α-aminoalkyl), ω-vinylbenzyl terminated poly(ethyleneoxides), as well as their silylated derivatives, including α-N,N-bis(trimethylsilyl)amine, ω-allyl terminated poly(ethyleneoxides), α-N,N-bis(trimethylsilyl)amine, ω-vinylbenzyl terminated poly(ethyleneoxides), and α-N,N-bis(trimethylsilyl)aminoethyl, ω-methacrylate ester terminated poly(ethyleneoxides), several of which are depicted below:

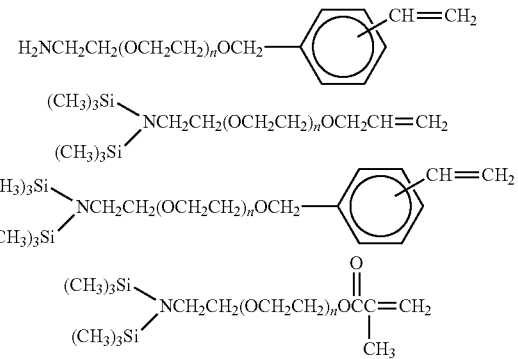

The inventive materials may be prepared by initiated polymerization of ethylene oxide with a compound such as an N-potassium or N-sodium hexaalkyldisilazane, such as potassium hexamethyldisilazane and potassium diethyltetramethyldisilazane, or a cyclic silazane, such as potassium 2,2,5,5-tetramethyl-2,5-disila-1-azacyclopentane (the latter compound for convenience, is referred to as potassium STABASE), according to the method described in M. Yokoyama et al. (*Bioconjugate Chemistry*, 3, 275-276 (1992), in International Patent Application Publication No. WO/9957174, and, more recently, in Chinese Patent Application Number CN 10155316B. In all cases, these polymerizations result in termination not suitable for radical or other associated polymerization techniques. In contrast to earlier work, the inventive materials are prepared by end-capping the polymer using an appropriate reagent, such as allyl bromide, vinylbenzyl chloride or an acryloyl chloride once the polymerization of the ethylene oxide is complete. If desired, the silylated terminal aminoalkyl may be de-blocked by a variety of methods, such as by hydrolysis or by the addition of a primary alcohol such as methanol to yield an amino terminus. Preparation of poly(alkyleneoxides) other than poly(ethyleneoxides) may be performed in a similar manner by using an appropriate alkylene oxide starting material for the initial polymerization.

Of particular interest is the ability to prepare materials with low degrees of polymerization. It has been found that the sodium analogs of the potassium initiators provide for greater control of the polymerization and, again in contrast to earlier work in which degrees of polymerization >50 were reported, low degrees of polymerization <10 can be achieved. While only polymers based on ethylene oxide are exemplified herein, the invention also includes other alkylene oxides, in particular propylene oxide, butylene oxide and glycidyl ethers of silicones.

An alternate method of synthesis is to utilize a STABASE-protected α-amino-ω-allyl terminated polyethylene oxide in advance of a Williamson ether synthesis. This procedure allows the preparation of α-(2,2,5,5-tetramethyl-1-aza-2,5-disilacyclopentane) -ω-allyl terminated polyethylene oxide using a commercially available mono-allyl terminated PEG and a α-halo-ω-aminoalkane, the amino group being protected as a STABASE adduct (2,2,5,5-tetramethyl-1-aza-2,5-disilacyclopentane). The synthetic route is illustrated in the scheme below:

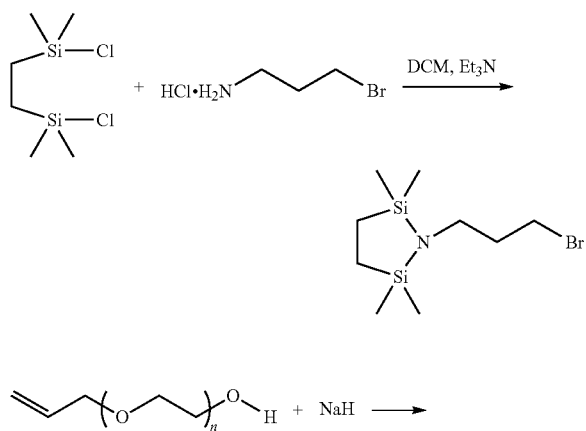

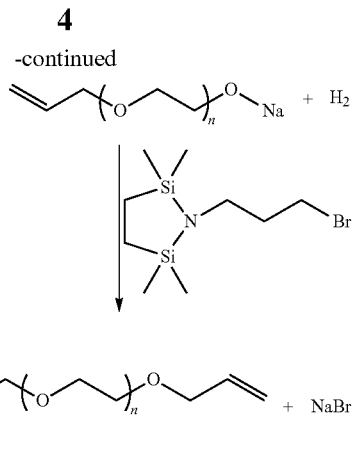

In general, however, the products of this invention are more preferably produced by the sodium or potassium silazane initiated polymerization route described above.

The inventive materials have obvious interest for the preparation of organic copolymers produced by radical polymerization. A potential example is the copolymerization of a vinylbenzyl-derived inventive material with styrene, as shown below:

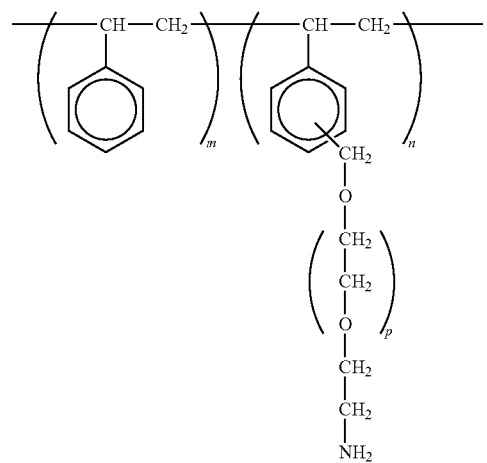

It is also within the scope of the invention to prepare copolymers of the inventive materials with other unsaturated or olefinic monomers.

It is also possible to prepare new siloxane compounds or compositions by hydosilylation of the unsaturated substituents of the inventive silylated aminoalkyl terminated poly(ethyleneoxides). An example includes the hydrosilylation of low molecular weight trisiloxanes, such as 1,1,1,3,5,5,5-heptamethyltrisiloxane, with an allyl terminated polymer according to the invention, leading to materials which are expected to exhibit surfactant behavior:

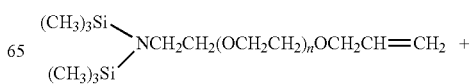

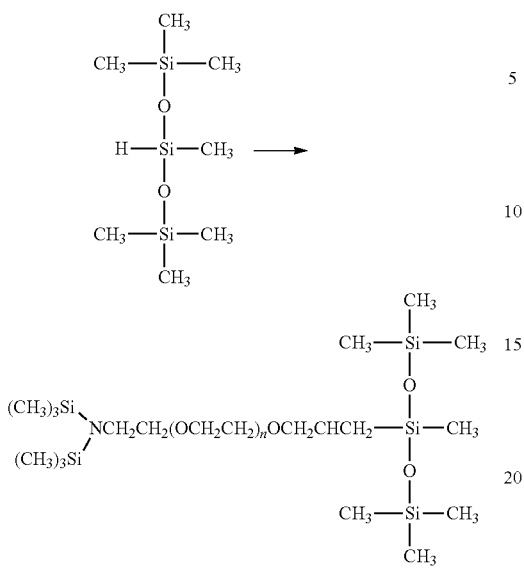

A lesser degree of byproduct reactions is observed when the silyl endgroup has greater stability as in the case of the STABASE or diphenyldisilaziane derivatives, making these materials preferred where purity is of most importance. On the other hand, the economics of the simpler hexamethyldisilazane derivatives make these most preferred for many applications.

Another example is the hydrosilylation of low-molecular weight hydride functional macromers, which are potentially materials of interest for the formation of oxygen permeable resins useful for applications including sensors, contact lenses and membranes.

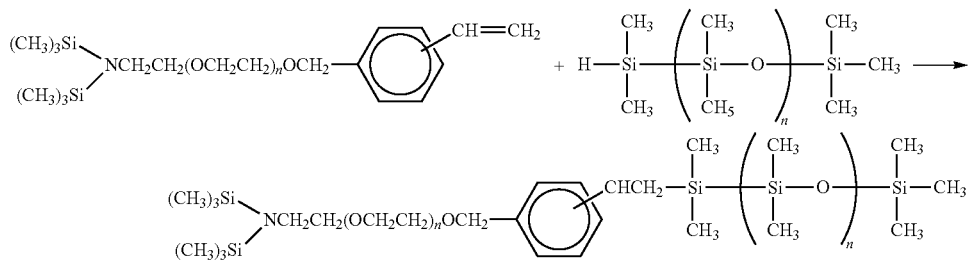

Analogously, hydridosilanes may also be reacted with the unsaturated substituents to form functionalized silanes. Most preferably, alkoxysilanes such as triethoxysilane (HSi(OC$_2$H$_5$)$_3$), trimethoxysilane, and methyldiethoxysilane, among others may form products by hydrosilylation with the olefin. Similarly, other silanes, such as trichlorosilane (HSiCl$_3$), methyldichlorosilane (CH$_3$HSiCl$_2$) and dimethylchlorosilane ((CH$_3$)$_2$HSiCl) can form products by hydrosilylation. All of these products are of utility in modifying the surface properties of solid surfaces, particularly siliceous surfaces.

After removal of the silyl blocking group, the amine group in the hydrosilylated products may be further derivatized to form a substituted amide, such as by reaction with an acid chloride such as dodecanoyl chloride, acryloyl chloride or methacryloyl chloride to form materials such as those shown below. These arylamide and methacrylamide functional macromer materials are potentially reactive surfactants and rheology modifiers. The deblocked amines can also be reacted with isocyanates to form substituted ureas.

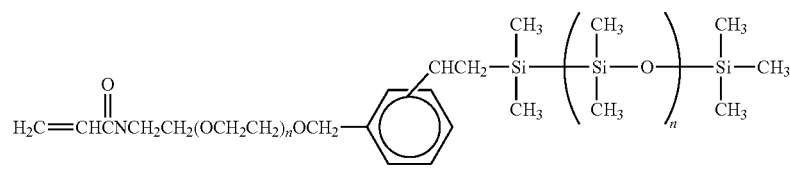

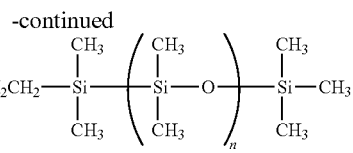

The invention will now be described in connection with the following, non-limiting examples.

Example 1: Synthesis of α-Bis(Trimethylsilylaminoethyl)-ω-Allyl Terminated Polyethylene Oxide (DP=45)

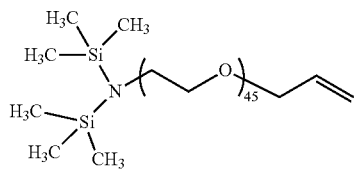

Potassium hexamethyldisilazane (181.4 g of 11 wt % solution in toluene; 0.1 mol), tetrahydrofuran (THF) (600 mL) and ethylene oxide (198 g; 4.5 mol) were successively charged to a 2-gallon autoclave under vacuum (20 mmHg) at room temperature. The reaction mixture was stirred and the pot temperature increased from 26° C. to 35° C. over four hours. After 48 hours of stirring, vacuum (20 mmHg) was reapplied to the autoclave and an allyl bromide (13.3 g; 0.11 mol) solution in THF (60 mL) was drawn into the reaction mixture under vacuum. The autoclave was heated to 40° C. and stirred for 24 hours.

The reaction mixture was collected, filtered and stripped under 0.1 mmHg vacuum to a maximum pot temperature of 80° C. A viscous brown oil (197 g) that solidified at room temperature was recovered. GPC data (polystyrene standard without correlation): Mn: 3090; Mw/Mn: 1.5. $^1$H NMR confirmed the expected structure.

Example 2: Synthesis of α-Bis(Trimethylsilylaminoethyl)-ω-Allyl Terminated Polyethylene Oxide (DP=22)

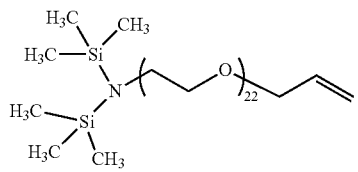

Potassium hexamethyldisilazane (362.8 g of 11 wt % solution in toluene; 0.2 mol), THF (600 mL) and ethylene oxide (198 g; 4.5 mol) were successively charged to a 2-gallon autoclave under vacuum (20 mmHg) at room temperature. The reaction mixture was stirred and the pot temperature increased from 25° C. to 52° C. over two hours. After 24 hours of stirring, vacuum (20 mmHg) was reapplied to the autoclave and an allyl bromide (42.3 g; 0.35 mol) solution in THF (100 mL) was drawn into the reaction mixture under vacuum. The autoclave was stirred for 24 hours at room temperature.

The reaction mixture was collected, filtered and stripped under 0.3 mmHg vacuum to a maximum pot temperature of 65° C. A viscous brown oil (132 g) that solidified at room temperature was recovered. GPC data (polystyrene standard without correlation): Mn: 1,780; Mw/Mn: 1.35. $^1$H NMR confirmed the expected structure.

Example 3: Synthesis of α-Bis(Trimethylsilylaminoethyl)-ω-Vinylbenzyl Terminated Polyethylene Oxide (DP=45)

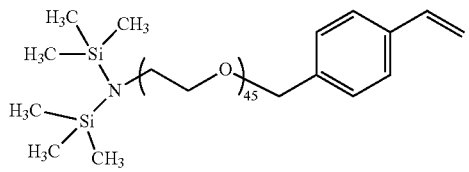

Potassium hexamethyldisilazane (100 g of 20 wt % solution in THF; 0.1 mol), THF (600 mL) and ethylene oxide (198 g; 4.5 mol) were successively charged to a 2-gallon autoclave under vacuum (20 mmHg) at room temperature. The reaction mixture was stirred for 20 hours. Vacuum (20 mmHg) was reapplied to the autoclave and a vinylbenzyl chloride (16.9 g; 0.11 mol) solution in THF (100 mL) was drawn into the reaction mixture under vacuum. The autoclave was stirred for 24 hours at room temperature.

The reaction mixture was inhibited with BHT (500 ppm), filtered and stripped under 0.1 mmHg vacuum to a maximum pot temperature of 80° C. A viscous brown oil (173 g) that solidified at room temperature was recovered. $^1$H NMR confirmed the expected structure.

Example 4a: Synthesis of α-Aminoethyl-ω-Allyl Terminated Polyethylene Oxide (DP=5)

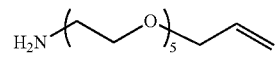

Potassium hexamethyldisilazane (300 g of 20 wt % solution in toluene; 0.3 mol), THF (500 mL) and ethylene oxide (70 g; 1.6 mol) were successively charged to a 2-gallon autoclave under vacuum (20 mmHg) at room temperature. The autoclave was blanketed with 4 psi of argon and the reaction was stirred at room temperature for 48 hours. Vacuum (20 mm Hg) was reapplied to the autoclave and an allyl bromide (54 g; 0.45 mol) solution in THF (200 mL) was charged to the reaction mixture. The autoclave was stirred for 24 hours at room temperature.

The reaction mixture was collected and added to a brine solution (1000 mL). The polyether was extracted from the aqueous layer with dichloromethane (2×400 mL). The organic layer was washed with a brine solution (500 mL), dried over sodium sulfate and stripped under 0.1 mmHg vacuum to a maximum pot temperature of 75° C. A viscous brown oil (102 g) was recovered. GPC data (polystyrene standard without correlation): Mn: 645; Mw/Mn: 1.41. $^1$H NMR confirmed the expected structure.

Example 4b: Synthesis of α-Aminoalkyl-ω-Allyl Terminated Polyethylene Oxide (DP=5)

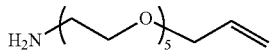

Potassium hexamethyldisilazane (725 g of 11 wt % solution in toluene; 0.4 mol) and ethylene oxide (90 g; 2.0 mol) were successively charged to a 2-gallon autoclave under vacuum (20 mm Hg) at room temperature. The autoclave was blanketed with 4 psi of argon and the reaction was stirred at room temperature for six hours. Vacuum (20 mmHg) was reapplied to the autoclave and an allyl bromide (73 g; 0.6 mol) solution in toluene (200 mL) was drawn into the reaction mixture under vacuum. The autoclave was stirred for sixteen hours at room temperature.

Methanol (500 mL) was charged in the autoclave, and the mixture was stirred for two hours at 60° C. The reaction mixture was collected, and the solvents removed in vacuo. The residue was fractionated between water and dichloromethane. The organic phase was collected and the aqueous layer was saturated with sodium chloride and extracted twice with dichloromethane. The combined organic phase was washed with brine, dried over sodium sulfate, and the solvents stripped under 0.1 mmHg vacuum to a maximum pot temperature of 75° C. A viscous brown oil (~115 g; >90% yield) was isolated.

Example 5: Synthesis of α-Bis(Trimethylsilylamino)-ω-Vinylbenzyl Terminated Polyethylene Oxide (DP=3)

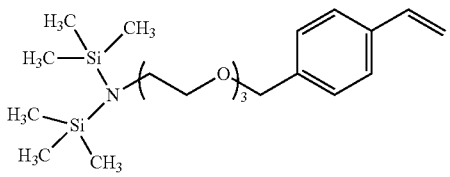

Sodium hexamethyldisilazane (135 g of a 2 molar solution in THF; 0.3 mol), THF (150 mL) and ethylene oxide (70 g; 1.6 mol) were successively charged to a 2-gallon autoclave under vacuum (20 mmHg). The autoclave was blanketed with 4 psi of argon and the mixture was heated to 60° C. over 30 minutes, then allowed to cool down to room temperature. After four hours, a solution of vinyl benzyl chloride (57 g; 0.375 mol) in THF (60 mL) was drawn into the autoclave under vacuum, and the mixture was heated to 65° C. over 1.5 hours. The mixture was stirred at room temperature for sixteen hours. The reaction mixture was collected, filtered through Celite calcined diatomaceous earth and the solvents were removed in vacuo (60° C.; 0.1 mmHg vacuum). A yellow oil was recovered (~120 g; >90% yield). 1H NMR confirmed the expected structure.

Example 6: Synthesis of α-Bis(Trimethylsilylaminoalkyl)-ω-Allyl Terminated Polyethylene Oxide (DP=5)

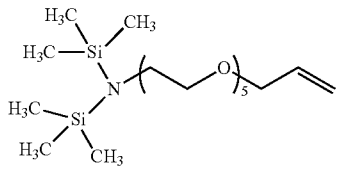

Potassium hexamethyldisilazane (544 g of 11 wt % solution in toluene; 0.3 mol) and ethylene oxide (80 g; 1.8 mol) were successively charged to a 2-gallons autoclave under vacuum (20 mm Hg) at room temperature. The autoclave was blanketed with 4 psi of argon and the reaction was stirred at room temperature for 26 hours. Vacuum (20 mmHg) was reapplied to the autoclave and an allyl bromide (54.5 g; 0.45 mol) solution in toluene (900 mL) was charged to the reaction mixture. The autoclave was stirred for 24 hours at room temperature. The organic phase was collected and concentrated in vacuo to 400 mL. Dichloromethane (1500 mL) was added to the reaction mixture and the KBr salts were allowed to settle over a 12 hour period. The reaction mixture was filtered through Celite and the solvents were removed in vacuo (60° C.; 0.6 mmHg). A clear yellow oil was recovered (~130 g; >90% yield). $^1$H NMR and FT-IR confirmed the expected structure.

Example 7: Synthesis of Potassium Salt of (2,2,5,5-tetramethyl-1-aza-2,5-disilacyclopentane) (STABASE, Potassium Salt)

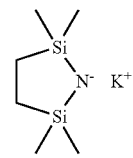

A 1000 mL, 4-neck round bottom flask was equipped with a mechanical stirrer, a 250 mL pressure equalizing addition funnel, a thermocouple, and a reflux condenser connected to a nitrogen bubbler. The reaction flask was charged with a previously hexanes-washed KH suspension (18.05 g; 0.45 mol) in 600 mL of toluene and 100 mL of THF. The reaction slurry was heated to 60° C. 2,2,5,5-Tetramethyl-1-aza-2,5-disilacyclopentane (STABASE; 47.80 g; 0.30 mol) was then added drop-wise to the reaction mixture over one hour. Hydrogen evolution was observed. The slurry was stirred at 60° C. for an additional 6 hours, overnight at room temperature, and another 4 hours at 65° C. The slurry was cooled down to room temperature. Excess KH was removed by filtration through a sintered glass funnel. The filtrate, containing the potassium salt of STABASE, was collected and used directly as initiator solution for ethylene oxide polymerization.

Example 8: Synthesis of α-(2,2,5,5-tetramethyl-1-aza-2,5-disilacyclopentane)-ω-allyl Terminated Polyethylene Oxide (DP=5) (STABASE-Protected α-amino-ω-allyl Terminated Polyethylene Oxide)

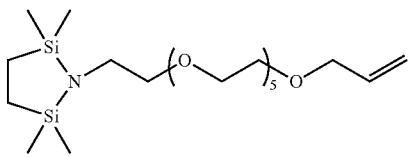

A freshly prepared solution of potassium salt of STABASE (0.3 mol) in 700 mL of a toluene/THF mixture (6:1, vol:vol, prepared as described in Example 7) and ethylene oxide (1.5 mol; 66.0 g) were successively charged into a 2-gallon autoclave under vacuum (20 mmHg) at room temperature. The autoclave was pressurized to 5 psi with argon, and the reaction mixture was stirred for 16 hours. Vacuum was reapplied to the autoclave and an allyl bromide (45.4 g; 0.375 mol) solution in THF (200 mL) was charged in the autoclave. The reaction was stirred at room temperature for 16 hours. At this stage, the autoclave content was collected and treated with 250 mL of DI water in a separating funnel. The organic phase was collected, and the aqueous phase extracted with 200 mL of toluene. The combined organic phases were dried over sodium sulfate, filtered, and stripped under 0.1 mm Hg vacuum to a maximum pot temperature of 110° C. A pale orange oil (101.55 g; 73%) was obtained. Proton NMR confirmed the structure and an average DP of 8. Refractive Index: 1.4636 at 25° C. Viscosity: 33 cPs at 25° C. Density: 1.010 g/L at 25° C. GPC data (polystyrene standard without correlation): Mn: 780; Mw/Mn: 1.1.

Example 9: Synthesis of 1-butyl-9-aminoethoxy(polyethyleneoxy)propyl decamethylpentasiloxane

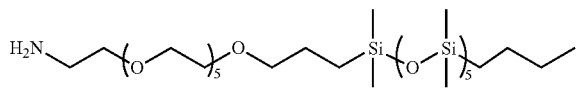

A 500 mL, 3-neck round bottom flask was equipped with a mechanical stirrer, a 250 mL pressure equalizing addition funnel, a thermocouple, and a reflux condenser connected to a nitrogen bubbler. The reaction flask was charged with 1-butyl-decamethylpentasiloxane (22.94 g; 0.050 mol) in toluene (100 mL), and the solution was heated to 90° C. A solution of α-(2,2,5,5-tetramethyl-1-aza-2,5-disilacyclopentane)-ω-allyl terminated polyethylene oxide (29.65 g; 0.050 mol; Example 8) in toluene (100 mL) was charged into the addition funnel, and added dropwise over 30 minutes. Once 5 mL were added, 1 mL of a solution of Karstedt's catalyst (prepared by diluting 1gram of a commercial Karstedt's catalyst solution in xylenes (2.1-2.4 Pt %) into 3 mL of toluene) was rapidly injected into the reaction mixture. Once the alkene addition was completed, another 1 mL of catalyst solution was added, and the reaction stirred at 90° C. for another hour. Analysis of an aliquot by proton NMR showed complete disappearance of the silyl hydride signal but the presence of residual alkene (about 50% of the initial amount). Additional 1-butyl-decamethylpentasiloxane (11.50 g; 0.025 mol) and 1 mL of the catalyst solution were added to the reaction mixture. The reaction was stirred for another 3.5 hours at 100° C., at which point proton NMR showed completion of the reaction. The reaction mixture was cooled down, diluted with 250 mL of dichloromethane, and treated with 100 mL of 1N aqueous KOH: the resulting emulsion was allowed to phase separate over 2 days. The organic phase was collected, dried over sodium sulfate and stripped under 0.1 mm Hg vacuum to a maximum pot temperature of 120° C. The resulting oil was treated with 6 grams of activated carbon for 2 hours then filtered through Celite. A reddish oil (51.6 g) was obtained. Proton NMR confirmed the expected structure (complete hydrosilylation and removal of the STABASE protecting group).

Example 10: Synthesis of 1-butyl-n-methacrylamidoethoxy(polyethyleneoxy)propyl Decamethylpentasiloxane

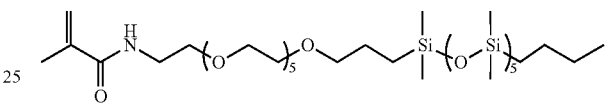

A 500 mL, 3-neck round bottom flask was equipped with a mechanical stirrer, a 250 mL pressure equalizing addition funnel, a thermocouple, and a reflux condenser connected to a nitrogen bubbler. The reaction flask was charged with 1-butyl-9-aminoethoxy(polyethyleneoxy)propyl decamethylpentasiloxane (51.50 g; 0.057 mol; Example 9), triethylamine (30 mL) and methylene chloride (150 mL). The reaction mixture was cooled using an ice/water bath. Methacryloyl anhydride (19.65 g; 0.127 mol) was charged in the addition funnel, and added drop-wise over 30 minutes, maintaining the reaction mixture at a temperature below 5° C. Once the addition was completed, the mixture was stirred for an additional 16 hours and allowed to slowly return to ambient temperature. The reaction mixture was treated with 250 mL of 1N aqueous KOH: the resulting emulsion was allowed to phase separate over 24 hours. The organic phase was collected, dried over sodium sulfate and the volatiles removed in vacuo (0.1 mm Hg) at room temperature. The resulting oil was treated with 5 grams of activated carbon for 5 hours then filtered through Celite. A clear orange oil (47.3 g) was obtained. Proton NMR and FT-IR confirmed the expected structure. GPC data (polystyrene standard without correlation): Mn: 1455; Mw/Mn: 1.07. Density: 0.965 g/mL. Refractive Index: 1.438 at 24.7° C. Viscosity: 30 cPs at 25 C.

Example 11: Synthesis of α-(2,2,5,5-tetramethyl-1-aza-2,5-disilacyclopentane)-ω-allyl Terminated Polyethylene Oxide (DP=6-7)

2,2,5,5-tetramethyl-1-(3-bromopropyl)-1-aza-2,5-disilacyclopentane was prepared according to Ueda et al. (*Macromolecules* (1990), 23, 939-945): a solution of 1,1,4,4-tetramethyl-1,4-dichloro-1,4-disilabutane (107.6 g; 0.50 mol) in 300 mL of dry dichloromethane was added over 3 hours to a mixture of 3-bromopropylamine hydrochloride (109.5 g, 0.50 mol) and dry triethylamine (210 mL; 1.5 mol) in 150 mL of dry dichloromethane at 25° C. under a nitrogen atmosphere. The mixture was stirred for 2 h at 25° C. The solvent was evaporated in vacuo, and the residue was triturated with hexane, filtered, and the volatiles were removed in vacuo to yield 92.15 g of pale yellow oil. This compound was used immediately as it decomposes at room temperature (but can be stored under nitrogen at low temperature for limited amounts of time).

Heterobifunctional PEG: A 500 mL, 3-neck round bottom flask was equipped with a mechanical stirrer, a 250 mL pressure equalizing addition funnel, a thermocouple, and a reflux condenser connected to a nitrogen bubbler. The reaction flask was charged with a previously hexanes-washed NaH suspension (2.4 g; 0.1 mol) in 100 mL of THF. To the slurry was added mono-allyloxy-polyethylene oxide (DP=4-7; 33.8 g; 0.1 mol) in solution in 100 mL of THF through the addition funnel. Hydrogen evolution was observed. Once the addition was completed, the reaction mixture was stirred at 60° C. for one hour then allowed to cool to room temperature. The solution was then filtered over a glass-sintered funnel and quickly charged into a 250 mL pressure equalizing addition funnel. A 500 mL, 3-neck round bottom flask was equipped with a mechanical stirrer, a thermocouple, and a reflux condenser connected to a nitrogen bubbler was charged with freshly prepared 2,2,5,5-tetramethyl-1-(3-bromopropyl)-1-aza-2,5-disilacyclopentane (30.8 g; 0.11 mol) in 200 mL of toluene. The flask was fitted with the addition funnel, and the sodium alkoxylate solution was added drop-wise over one hour. The mixture was stirred at room temperature for 16 hours. Analysis by proton NMR of an aliquot showed approximately 50% conversion. Heating of the reaction mixture slightly increased the yield of heterobifunctional PEG along with decomposition of 2,2,5,5-tetramethyl-1-(3-bromopropyl)-1-aza-2,5-disilacyclopentane.

Example 12: Synthesis of 1,3-dimethyl-1,3-diphenyl-1,3-divinyldisilazane, Potassium Salt

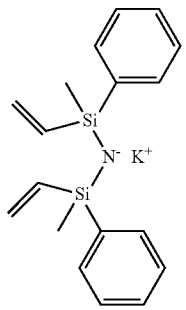 [SMILES: C=C[Si](C)([N-][Si](C)(C=C)c1ccccc1)c1ccccc1 ; [K+]]

A 1000 mL, 4-neck round bottom flask was equipped with a mechanical stirrer, a thermocouple, and a reflux condenser connected to a nitrogen bubbler. The reaction flask was charged with 1,3-dimethyl-1,3-diphenyl-1,3-divinyldisilazane (93.0 g; 0.3 mol), 100 mL of THF and 200 mL of toluene. The solution was heated at 60° C. A previously hexanes-washed KH suspension (6.0 g; 0.15 mol) in 100 mL of toluene was carefully added to the reaction mixture: immediate hydrogen evolution was observed. After one hour, the first portion of KH was completely consumed (clear solution) and a second portion of previously hexanes-washed KH suspension (6.4 g; 0.16 mol) in 100 mL of toluene was added. The slurry was stirred for 10 hours at 60° C. and 16 hours at room temperature. The resulting suspension was filtered over a glass sintered funnel, and the filtrate containing the potassium salt of 1,3-dimethyl-1,3-diphenyl-1,3-divinyldisilazane was collected and used directly as initiator solution for ethylene oxide polymerization (approximate concentration: 0.6 mol/L).

Example 13: Synthesis of bis(methylphenylvinylsilyl)-protected-α-amino-ω-allyl Terminated Polyethylene Oxide (DP~11)

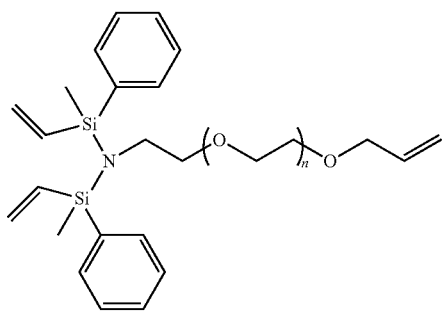

A freshly prepared solution of potassium salt of 1,3-dimethyl-1,3-diphenyl-1,3-divinyldisilazane (0.15 mol; 250 mL) as described in Example 12 and 500 mL of THF were successively charged into a 2-gallon autoclave under vacuum (20 mmHg) at room temperature. Ethylene oxide (76 g; 1.7 mol) was added, and argon gas added until the reactor reached atmospheric pressure. The reaction mixture was stirred for 24 hours. Vacuum was reapplied to the autoclave and allyl bromide (36.3 g; 0.3 mol) as a solution in toluene (250 mL) was charged in the autoclave. The reaction was stirred at room temperature for 3 days. At this stage, the autoclave content was collected, and the fine precipitated salts were allowed to settle down. The mixture was then filtered, and the volatiles removed in vacuo at room temperature. An orange oil (81.666 g; 64%) was obtained. Proton NMR confirmed the structure. Refractive Index: 1.5081 at 25° C. Viscosity: 161 cPs at 25° C. Density: 1.075 mg/mL at 25° C. GPC data (polystyrene standard without correlation):
Mn: 343; Mw/Mn: 2.26.

Example 14: Synthesis of 1,3-diethyltetramethyldisilazane, Sodium Salt

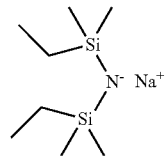

A 250 mL, 3-neck round bottom flask was equipped with a mechanical stirrer, a 250 mL pressure equalizing addition funnel, a thermocouple, and a reflux condenser connected to a nitrogen bubbler. The reaction flask was charged with a hexanes-washed NaH in oil suspension (5.3 g; 0.22 mol) in 100 mL of xylenes. 1,3-diethyl-tetramethyldisilazane (37.9 g; 0.20 mol) was added drop-wise using the addition funnel. The mixture was then heated to 120° C. for 12 hours and at room temperature for 16 hours. The slurry was filtered, and the filtrate containing the sodium salt of 1,3-diethyl-tetramethyldisilazane was collected and used directly as initiator solution for ethylene oxide polymerization.

Example 15: Synthesis of α-amino-ω-allyl Terminated Polyethylene Oxide from bis(ethyldimethylsilyl)-Protected-α-amino-ω-allyl Terminated Polyethylene Oxide (DP~9)

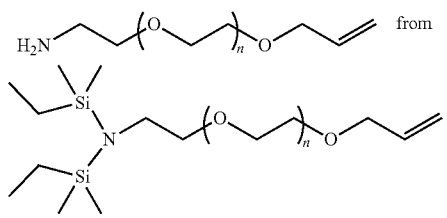

A freshly prepared solution of the sodium salt of 1,3-diethyltetramethyldisilazane in xylenes (Example 14) was charged with 125 mL of THF into a 2-gallon autoclave under vacuum (20 mmHg) at room temperature. Ethylene oxide (80 g; 1.80 mol) was added, and the autoclave was pressurized to 5 psi with argon. The reaction mixture was stirred for 16 hours at room temperature. Analysis of an aliquot showed only minor conversion (polymerization) of ethylene oxide. The autoclave was then heated between 50° C. and 90'C for 24 hours. Analysis of a second aliquot indicated a successful polymerization. Vacuum was reapplied to the autoclave and an allyl bromide (36.3 g; 0.30 mol) solution in toluene (200 mL) was charged in the autoclave. The reaction was stirred at room temperature for 16 hours. The crude material was directly subjected to a deprotection step of the silyl groups to generate the terminal amino group: the autoclave content was collected, and treated with 400 mL of 2N aqueous HCl in a separating funnel with 100 mL of methylene chloride. The aqueous phase was collected, and the pH adjusted to 14 using concentrated aqueous KOH. The basic aqueous phase was extracted twice with 250 mL of methylene chloride. The combined organic phase were dried over sodium sulfate, filtered, and stripped under 0.1 mm Hg vacuum to a maximum pot temperature of 100° C. A reddish oil (66.4 g; 74%) was obtained. Proton NMR analysis confirmed complete removal of the protecting groups and an average DP of 9.

Example 16: Synthesis of α-Amino-ω-Allyl Terminated Polyethylene Oxide from Bis(Trimethylsilyl)-Protected-α-Amino-ω-Allyl Terminated Polyethylene Oxide (DP~5)

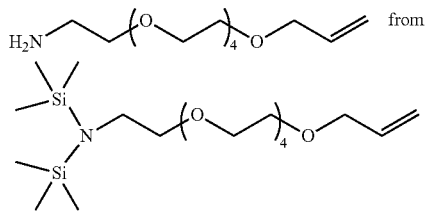

Potassium hexamethyldisilazane (1,088.0 g of 11 wt % solution in toluene; 0.6 mol) and ethylene oxide (150.0 g; 3.4 mol) were successively charged to a 2-gallon autoclave under vacuum (20 mmHg) at room temperature. The autoclave was pressurized to 5 psi with argon, and the reaction mixture was stirred for 20 hours at room temperature. Vacuum was reapplied to the autoclave and an allyl bromide (109.0 g; 0.9 mol) solution in toluene (400 mL) was charged in the autoclave. The reaction was stirred at room temperature for 16 hours. At this stage, the autoclave content was collected and treated with 400 mL of aqueous HCl (2N) in a separating funnel. The aqueous phase was collected, and the toluene phase (containing only the removed protecting TMS groups) was discarded. The acidic aqueous phase was extracted again with 500 mL of methylene chloride: organics were discarded (only contained traces of PEG and allyl PEG ether, with no amine functionality). The aqueous phase was then treated with concentrated aqueous KOH until pH reached an approximate value of 14. The basic aqueous phase was extracted with 500 mL of methylene chloride. 500 mL of a brine solution were added to the aqueous phase, and the resulting solution was extracted with another 600 mL of methylene chloride. The combined organic phases were dried over sodium sulfate, filtered and stripped under 1 mm Hg vacuum to a maximum pot temperature of 75° C. A pale orange oil (90.5 g; 59% yield) was obtained. Proton NMR confirmed the expected structure, and an average DP of 4.6. An average molecular weight of 256.0 was calculated. The product was used for further modifications.

Example 17: Synthesis of α-Dodecanoylamide-ω-Allyl Terminated Polyethylene Oxide (DP~5)

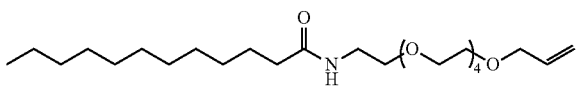

A 500 mL, 3-neck round bottom flask was equipped with a mechanical stirrer, a 250 mL pressure equalizing addition funnel, a thermocouple, and a reflux condenser connected to a nitrogen bubbler. The reaction flask was charged with α-amino-ω-allyl terminated polyethylene oxide (DP~5; Example 16; 25.60 g; 0.10 mol), triethylamine (25.30 g; 0.25 mol) and methylene chloride (100 mL). The mixture was cooled to a temperature of 0-5° C. using an ice/water bath. Dodecanoyl chloride (27.40 g; 0.125 mol) was dissolved in 25 mL of methylene chloride (25 mL) and charged into the addition funnel. This solution was added drop-wise to the reaction mixture, keeping the temperature below 10° C. The reaction mixture was stirred at low temperature for another one hour, at which point the ice/water bath was removed. The reaction was stirred for 4 days at room temperature. The reaction mixture was then diluted with 300 mL of methylene chloride, and extracted twice with 200 mL of 2N aqueous HCl in a separation funnel. The organic phase was then extracted twice with aqueous 1N KOH. The organic phase was dried over sodium sulfate, filtered, and stripped under 0.1 mm Hg vacuum to a maximum pot temperature of 100° C. An orange oil (37.4 g; 85% yield) was obtained. Proton NMR confirmed the expected structure.

Example 18: Synthesis of α-Dodecanoylamide-ω-(Triethoxysilyl)Propyl Terminated Polyethylene Oxide (DP~5)

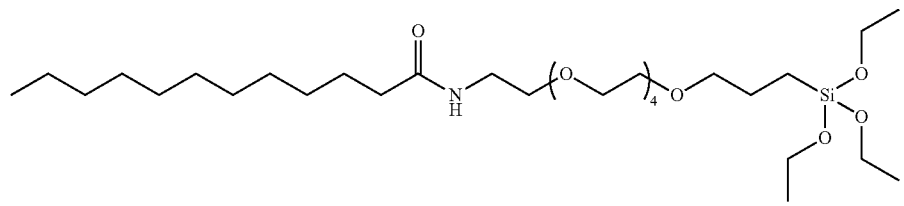

A 250 mL, 3-neck round bottom flask was equipped with a mechanical stirrer, a 250 mL pressure equalizing addition funnel, a thermocouple, and a reflux condenser connected to a nitrogen bubbler. The reaction flask was charged with α-dodecanoylamide-ω-allyl terminated polyethylene oxide (DP~5) (Example 17; 30.0 g; 70 mmol) and 50 mL of toluene. The reaction mixture was heated to 110° C. Triethoxysilane (17.25 g; 105 mmol) was charged in the addition funnel. 1.0 g of a Karstedt's catalyst solution (platinum(0)-1,3-divinyl-1,1,3,3-tetramethyldisiloxane complex solution in xylenes, 2.1-2.4 wt % Pt) was quickly injected to the reaction mixture, and a drop-wise addition of the silane was started. After the end of silane addition, the reaction mixture was stirred for another 2 hours, at which point a second portion of catalyst (0.5 g) and silane (10.0 g) was added to the pot. The mixture was stirred at 110° C. for another 4 hours, and at room temperature for 16 hours. The reaction mixture was cooled down to 50° C., and stirred with 5 grams of activated Carbon for 4 hours. It was then cooled to room temperature, and filtered over a short pad of Celite. The collected solution was stripped under 0.1 mm Hg vacuum to a maximum pot temperature of 90° C. to yield 36.0 g (85%) of reddish oil. Proton NMR confirmed the expected structure. Density: 0.989 g/mL at 25° C., Refractive Index: 1.454 at 25° C., Viscosity: 78 cPs at 25° C. GPC: Mn=997; Mw/Mn=2.04.

Example 19: Surface Modification of Glass Slide with α-Dodecanoylamide-ω-(Triethoxysilyl)Propyl-Terminated Polyethylene Oxide (DP~5)

An acid-cleaned borosilicate glass slide was immersed in a 70 g solution containing 90 wt % ethanol, 5 wt % deionized water, 5 wt % α-dodecanoylamide-ω-(triethoxysilyl)propyl-terminated polyethylene oxide (DP~5) (Example 18), and 0.05 wt % acetic acid for 1 hour at ambient temperature. The treated glass slide was removed from solution and dipped once in an ethanol solution. The slide was dried under nitrogen flow and placed in an oven set at 110° C. for 1 hour. The slide was cooled to room temperature and contact angle measurements of deionized water on the treated borosilicate glass surface were recorded. An average contact angle of 66.1° was observed. An average contact angle value of 8.4° for hexadecane was also recorded, indicating a successful surface treatment of the borosilicate glass slide.

Example 20: Synthesis of α-Amino-ω-(Triethoxysilyl)Propyl-Terminated Polyethylene Oxide from Bis(Trimethylsilyl)-Protected-α-Amino-ω-Allyl Terminated Polyethylene Oxide (DP~5)

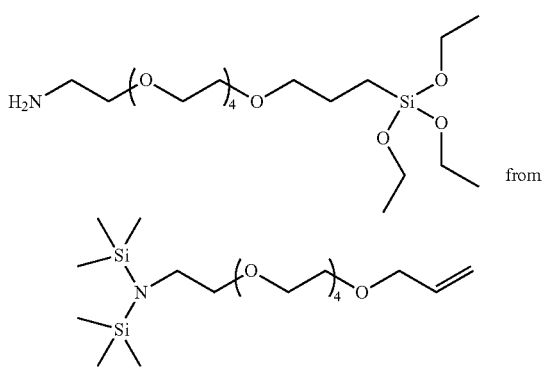

from

Bis(trimethylsilyl)-protected-α-amino-ω-allyl terminated polyethylene oxide (DP~5) was prepared as described in Example 16. The crude material from the autoclave was collected, allowed to settle (potassium bromide salts), then filtered over a zeta pad. The crude material was stripped under 0.1 mm Hg vacuum to a maximum pot temperature of 60° C.: the resulting light yellow oil was used directly for the hydrosilylation step. (Proton NMR confirmed the expected structure, GPC data: Mn=437, Mw/Mn=1.174). A 250 mL, 3-neck round bottom flask was equipped with a mechanical stirrer, a 250 mL pressure equalizing addition funnel, a thermocouple, and a reflux condenser connected to a nitrogen bubbler. The reaction flask was charged with bis(trimethylsilyl)-protected-α-amino-ω-allyl terminated polyethylene oxide (DP~5) (22.0 g; 55 mmol) and 200 mL of toluene. The reaction mixture was heated to 110° C. Triethoxysilane (18.0 g; 110 mmol) was charged in the addition funnel. 2.0 g of a Karstedt's catalyst solution (Platinum (0)-1,3-divinyl-1,1,3,3-tetramethyldisiloxane complex solution in xylenes, 2.1-2.4 wt % Pt) was quickly injected to the reaction mixture, and a dropwise addition of the silane was started. After the end of silane addition, the reaction mixture was stirred for another 4 hours, at which point a second portion of catalyst (0.5 g) and silane (10.0 g) was added to the pot. The mixture was stirred at 110° C. for another 4 hours, and at room temperature for 16 hours. The reaction mixture was stripped under 0.15 mm Hg vacuum to a maximum pot temperature of 70° C., and the residue was treated with 150 mL of ethanol at 50° C. for 2 hours. The solution was stripped again under 1 mm Hg vacuum to a maximum pot temperature of 100° C. It was then cooled to room temperature, and treated with 5 grams of activated carbon for one hour. The slurry was filtered over a short pad of Celite to yield 26.6 g (93%) of reddish oil. Proton NMR confirmed the expected structure. Density: 1.031 g/mL at 25° C., Refractive Index: 1.438 at 25° C., Viscosity: 180. cPs at 25° C. GPC: Mn=668, Mw/Mn=3.22.

Example 21: Surface Modification of Glass Slide with α-Amino-ω-(Triethoxysilyl)Propyl-Terminated Polyethylene Oxide (DP~5)

An acid-cleaned borosilicate glass slide was immersed in a 70 g solution containing 90 wt % ethanol, 5 wt % deionized water, 5 wt % α-amino-ω-(triethoxysilyl)propyl-terminated polyethylene oxide (DP~5) (Example 20), and 0.05 wt % acetic acid for 1 hour at ambient temperature. The treated glass slide was removed from solution and dipped once in an ethanol solution. The slide was dried under nitrogen flow and placed in an oven set at 110° C. for 1 hour. The slide was cooled to room temperature and contact angle measurements of deionized water on the treated borosilicate glass surface were recorded. An average contact angle of 58.1° was observed. An average contact angle value of 6.9° for hexadecane was also recorded, indicating a successful surface treatment of the borosilicate glass slide.

Example 22: Synthesis of α-(Ureidopropyltriethoxysilyl)-ω-Allyl Terminated Polyethylene Oxide (DP~6-7)

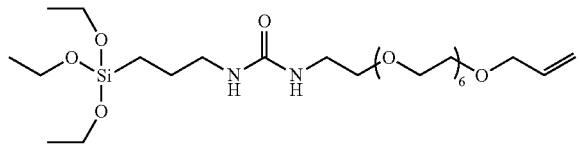

A 250 mL, 3-neck round bottom flask was equipped with a mechanical stirrer, a 250 mL pressure equalizing addition funnel, a thermocouple, and a reflux condenser connected to a nitrogen bubbler. The reaction flask was charged with isocyanatopropyltriethoxysilane (40 mmol; 9.86 g) and 25 mL of tetrahydrofuran. α-amino-ω-allyl terminated polyethylene oxide (DP~6-7; 40 mmol; 14.00 g) was charged into the addition funnel, and added dropwise to the isocyanate solution. During the addition, an exotherm occurred and the temperature rose to 35° C. The mixture was stirred for 16 hours at room temperature. Volatiles were stripped under 0.4 mm Hg vacuum to a maximum pot temperature of 50° C. to yield 23.46 g of an oil (98%). Proton NMR confirmed the expected structure. Viscosity: 134 cPs at 25° C. Density: 1.062 g/mL at 25° C. GPC: Mn=655, Mw/Mn=1.38.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An amide reaction product of an acid chloride with a composition formed by the hydrosilylation of a siloxane with a heterofunctional poly(alkyleneoxide) having a linear completely poly(alkyleneoxide) backbone and first and second polymer termini, wherein the first polymer terminus comprises a protected, unprotected, or derivatized aminoalkyl functionality and the second polymer terminus comprises an unsaturated functionality.

2. A substituted urea product of an isocyanate with a composition formed by the hydrosilylation of a siloxane with a heterofunctional poly(alkyleneoxide) having a linear completely poly(alkyleneoxide) backbone and first and second polymer termini, wherein the first polymer terminus comprises a protected, unprotected, or derivatized aminoalkyl functionality and the second polymer terminus comprises an unsaturated functionality.

3. The reaction product according to claim 1, wherein the amide is an acrylamide, methacrylamide, or alkylamide functional macromer.

4. A composition formed by the hydrosilylation of a siloxane with a heterofunctional poly(alkyleneoxide) having a linear completely poly(alkyleneoxide) backbone and first and second polymer termini, wherein the first polymer terminus comprises a protected, unprotected, or derivatized aminoalkyl functionality and the second polymer terminus comprises an unsaturated functionality, wherein the composition is 1-butyl-9-aminoethoxy(polyethyleneoxy)propyl decamethylpentasiloxane.

5. A composition formed by the hydrosilylation of a siloxane with a heterofunctional poly(alkyleneoxide) having a linear completely poly(alkyleneoxide) backbone and first and second polymer termini, wherein the first polymer terminus comprises a protected, unprotected, or derivatized aminoalkyl functionality and the second polymer terminus comprises an unsaturated functionality, wherein the composition is 1-butyl-n-methacrylamidoethoxy(polyethyleneoxy)propyl decamethylpentasiloxane.

6. The amide reaction product according to claim 1, wherein the protected aminoalkyl functionality comprises a silylated aminoalkyl group, the unprotected aminoalkyl functionality comprises an α-aminoalkyl group, and the derivatized aminoalkyl functionality comprises an amide or urea group.

7. The amide reaction product according to claim 1, wherein the unsaturated functionality is coupled to the poly(alkyleneoxide) backbone by an ether linkage.

8. A composition formed by the hydrosilylation of a silane with a heterofunctional poly(alkyleneoxide) having a linear completely poly(alkyleneoxide) backbone and first and second polymer termini, wherein the first polymer terminus comprises a protected, unprotected, or derivatized aminoalkyl functionality and the second polymer terminus comprises an unsaturated functionality, wherein the composition is α-dodecanoylamide-ω-(triethoxysilyl)propyl terminated polyethylene oxide.

9. A composition formed by the hydrosilylation of a silane with a heterofunctional poly(alkyleneoxide) having a linear completely poly(alkyleneoxide) backbone and first and second polymer termini, wherein the first polymer terminus comprises a protected, unprotected, or derivatized aminoalkyl functionality and the second polymer terminus comprises an unsaturated functionality, wherein the composition is α-amino-ω-(triethoxysilyl)propyl-terminated polyethylene oxide.

10. A heterofunctional poly(alkyleneoxide) having a linear completely poly(alkyleneoxide) backbone and first and second polymer termini, wherein the poly(alkyleneoxide) is α-dodecanoylamide-ω-allyl terminated polyethylene oxide.

11. The substituted urea product according to claim 2, wherein the protected aminoalkyl functionality comprises a silylated aminoalkyl group, the unprotected aminoalkyl functionality comprises an α-aminoalkyl group, and the derivatized aminoalkyl functionality comprises an amide or urea group.

12. The substituted urea product according to claim 2, wherein the unsaturated functionality is coupled to the poly(alkyleneoxide) backbone by an ether linkage.

\* \* \* \* \*